Dec. 29, 1964  C. L. KIMBELL  3,163,845
ANALOG COMPUTER FOR USE IN SEISMIC EXPLORATION
Filed April 3, 1961
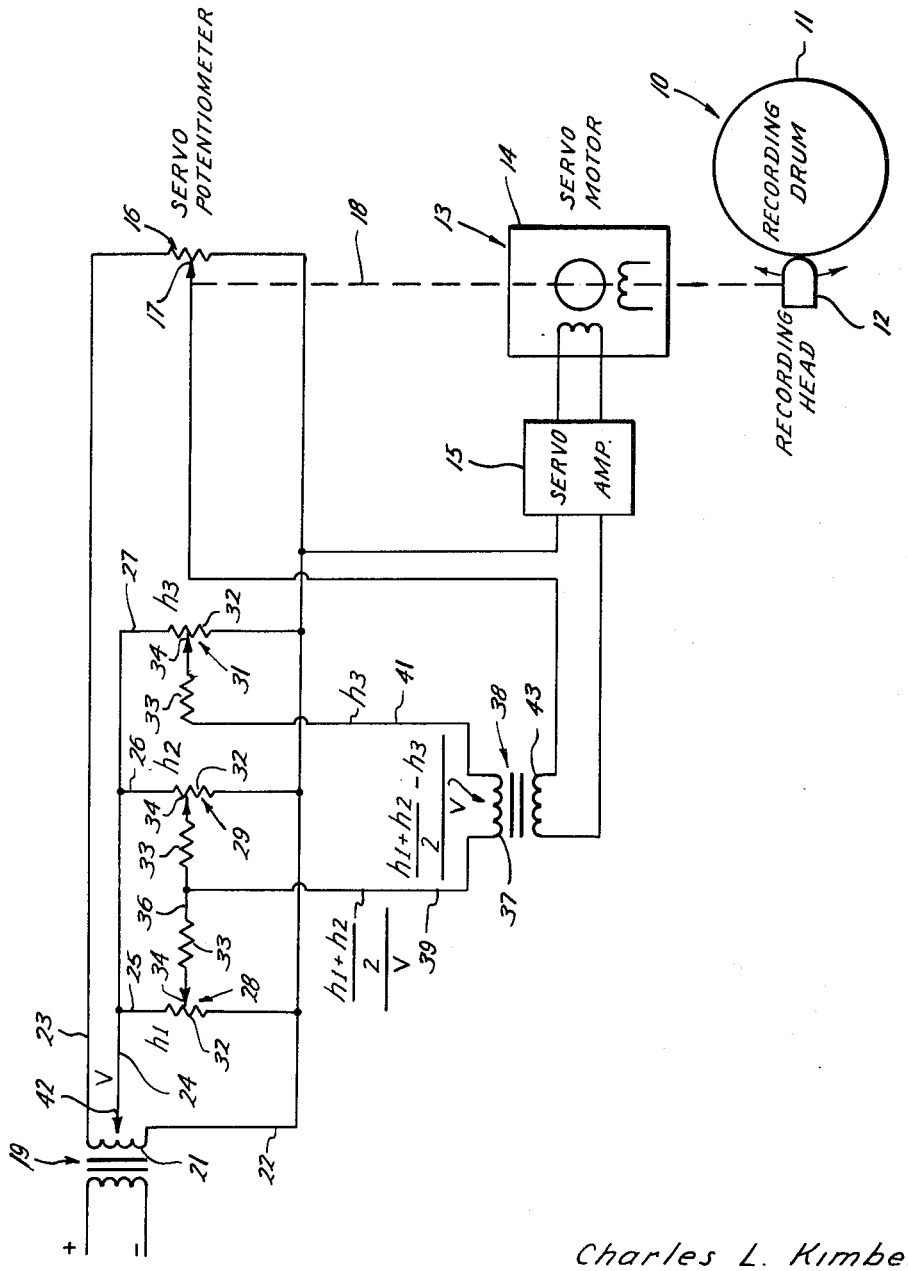
Charles L. Kimbell
INVENTOR.
BY *Vincent Martin*
*Joe E Edwards*
*M H Gay*
ATTORNEYS United States Patent Office 3,163,845
Patented Dec. 29, 1964

3,163,845
ANALOG COMPUTER FOR USE IN SEISMIC EXPLORATION
Charles L. Kimbell, Houston, Tex., assignor to Independent Exploration Company, Houston, Tex., a corporation of Delaware
Filed Apr. 3, 1961, Ser. No. 100,038
7 Claims. (Cl. 340—15.5)

This invention relates to analog computers, and more particularly to analog computers for programming data into the recording system of seismic exploration equipment.

Seismic waves are frequently used in subsurface exploration. The waves are customarily generated by setting off an explosive charge or by striking the surface of the earth with a weight. The waves travel downwardly through the earth and are reflected by a subsurface interface and return to the earth's surface. A suitable detector senses the arrival of the reflected waves and transmits its received signals to a recorder. The recorder records the time at which the seismic waves are generated and time at which the reflected waves are received at the surface. From these recordings much information is obtained relating to subsurface formations.

It is necessary to compute certain mathematical quantities and adjust the seismic recording to eliminate these variables from the processed seismic data. In the past these computations have been carried out manually and then introduced into the recording machine.

The manual handling and computation of data allows many opportunities for human error and requires considerable time-consuming work of a routine nature.

To obtain a corrected seismic record the elevation of the source of the seismic wave must be determined, the elevation of the detector which receives the reflected wave must be determined, and the average velocity in the earth above a selected datum plane must be determined. The datum plane is established as a reference plane to which all seismic waves which are to be considered together are to be adjusted. The elevation of the seismic source and the elevation of the detector are then averaged and this sum less the elevation of the datum plane multiplied by two and divided by the average velocity in the earth above the datum to give the travel time of the seismic wave from the surface down to the datum and from datum up to the detector. By introducing this value into the recording machine to adjust the time break, the finished recording will indicate directly the travel time of the seismic wave from the datum plane to the subsurface interface and return to the datum plane.

It is an object of this invention to provide an electrical network analog computer for carrying out the above computation and shifting the position of the recording head relative to the recording drum to reflect the desired correction so that the recording indicates directly the travel time of the seismic wave beginning and ending at the datum plane.

Another object is to provide an electrical network analog computer as in the preceding object in which the position of the recording head is controlled by a servo-motor which is positioned in response to a signal automatically generated by dialing in the several values from which the computation is to be made.

Another object is to provide an analog computer as in the preceding objects for positioning the recording head relative to a recording drum which is extremely simple in construction and utilizes potentiometers as means for introducing the several variables into the computer.

Another object is to provide an apparatus for correcting the recording of a seismic wave to a datum plane which is inexpensive and reliable in operation.

Other objects, features and advantages of the invention will be apparent from the drawing, the specification and the claims.

The single figure shows schematically the recording drum and recording head of a seismic recording system with the recording head positioned by a servo-motor driven by a signal received from a computer network which is illustrated schematically.

The following symbols will be used herein:

$h_1$ = elevation of the seismic source
$h_2$ = elevation of the detector receiving the reflected seismic wave
$h_3$ = the datum plane selected to be used for all work
$v$ = the average velocity in feet/sec. of the seismic wave measured in the material above the datum plane.
$t$ = seismic wave travel time from the surface down to datum and from datum up to the detector.

The mathematical formula to be solved in accordance with this invention is:

$$2\frac{\left[\frac{(h_1+h_2)}{2}-h_3\right]}{v} = t$$

The above formula is exactly accurate for vertical-traveling waves only. In practice this formula is accurate enough for practical purposes in most cases because the slant angle of the wave path is very nearly vertical.

In the drawing, a recording system is illustrated schematically at 10 and includes a recording drum 11 and a movable recording head 12. These may be of any desired construction.

A servo-system indicated generally at 13 is provided to position the recording head relative to the recording drum. The servo-system preferably includes the servo-motor 14 and its associated servo-amplifier 15.

As is conventional with servo-systems, a means is provided which is ganged with the recording head to pick off a voltage from a suitable source responsive to the position of the recording head. In the preferred form of this invention this means is provided by the servo-potentiometer indicated generally at 16. The contact point 17 of the servo-potentiometer 16 is ganged to the recording head 12 as indicated by the dashed line 18. This dashed line also indicates the motor 14 to be ganged to the recording head. Thus, the position of the sliding contact 17 of the servo-potentiometer 16 will be governed by the position of the recording head 12.

A source of potential for the servo-potentiometer may be provided from any desired current source such as the first transformer indicated generally at 19 which has its secondary 21 connected to the servo-potentiometer 16 through lines 22 and 23. It will be noted that line 23 taps off a desired potential from the secondary 21 of the first transformer 19 and that this potential is present across potentiometer 16.

In accordance with this invention, the potential tapped off by contact point 17, and an opposite phase potential representative of time $t$ solved in accordance with the above formula, are fed to the servo-system, and any difference in these two potentials is utilized to drive the servo-motor and re-position the recording head 12 to a position at which the voltage equivalent to time $t$ is equaled by the voltage tapped off by contact 17 of the servo-potentiometer.

In solving the time equation, a voltage is tapped off from a suitable current source such as the secondary 21 of the first transformer 19 through line 24. Line 24 provides a part of a circuit which also includes parallel branches 25, 26 and 27. The circuit also includes a portion of line 22 to which each of the parallel branches is attached to provide a return line to first transformer 19.

Means are provided in each of the parallel branches 25, 26 and 27 for tapping off a selected voltage from these parallel branches. Preferably, the means are provided by potentiometers indicated generally at 28 in branch line 25, 29 in branch line 26, and 31 in branch line 27. It will be noted that these potentiometers 28, 29 and 31 have also been labeled $h_1$, $h_2$ and $h_3$, respectively, as these values should be introduced into the circuit through these potentiometers. It might be noted that the potentiometers are preferably identical and that the resistance 32 which is connected in each of the parallel branches is relatively small as compared to the resistance 33 to which the contact points 34 are attached. Preferably, the resistances 33 are on the order of one hundred times greater than the resistances 32, so that very little current will flow through the control points.

Connection means provided by conductor 36 interconnects the contact points of potentiometers 28 and 29. As there will be substantially no feed-back current between potentiometer 31 and the two potentiometers 28 and 29, the voltage at connecting means 36 will be the average of the voltages tapped off by potentiometers 28 and 29, thus providing at this point $$\frac{h_1+h_2}{2}$$

Means are provided for generating a first output voltage proportional to the difference between the voltage at said connecting means 36 and the voltage tapped off by the potentiometer 31. Any desired means which is capable of sensing the difference between these two voltages may be utilized. Preferably, the primary winding 37 of a second transformer indicated generally at 38 is connected through lines 39 and 41, respectively, to the connecting means 36 and the contact point 34 of potentiometer 31. The transformer 38 serves the additional function of providing in the primary winding 37 a high impedance to reduce current flow through the transformer to a low value, and in this way reduce feed-back current to a value at which it does not substantially disturb the mathematical relationship. Thus, it will be seen that a voltage drop exists across the primary 37 proportional to $$\frac{h_1+h_2}{2}-h_3$$

In accordance with the formula it is desired to multiply this equation by 2. This might be accomplished in many different manners in the circuit, as for instance by the calibration of the movement of the recording head, or by a 2 for 1 step-up transformer. Preferably, the transformer 38 is a step-up 2 for 1 transformer which multiplies the equation $$\frac{h_1+h_2}{2}-h_3$$

by 2.

In accordance with the formula, it is desirable to divide $$2\left[\frac{h_1+h_2}{2}-h_3\right]$$

by $v$. While it is possible to divide the numerator of the equation by suitable resistances in any appropriate portion of the circuit, such as in the branch lines 25, 26 and 27 as shown in my co-pending application S.N. 100,111 for Analog Computer filed on even date herewith, it is preferred in this form of computer to divide the numerator by tapping off a voltage proportional to $v$ from the secondary 21 of the first transformer 19 with a movable tap 42 on line 24 and feed this voltage to the three parallel legs 25, 26 and 27. When this manner of introducing the denominator of the equation is utilized, it will be appreciated that a voltage equal to $$\frac{\frac{h_1+h_2}{2}-h_3}{v}$$

will appear across the primary coil 37 of the second transformer 38. By utilizing the step-up transformer, the voltage appearing across the secondary winding 43 of the second transformer 38 will be a value equal to $t$.

In accordance with this invention, the voltage generated in secondary winding 43, which may be referred to as a first voltage, is conducted to the servo-system and therein is compared with the voltage tapped off by the servo-potentiometer 16.

In utilizing the type of servo-system shown, the two voltages should be compared by having them out of phase with each other. As $h_3$ represents a datum plane which is normally at a lower elevation than $h_1$ and $h_2$, the solution of the formula for 6 will give a positive answer. The means for comparing the average of $h_1$ and $h_2$ with $h_3$ should be such that the first output voltage from this means at any given instant is out of phase with the voltage tapped off of servo-potentiometer 16. Thus, in the circuit including this means and the servo-potentiometer contact 17, a potential should appear which is the difference between these two voltages, if any. This difference, if any, then drives the servo-motor system until the two out-of-phase potentials are equal.

By utilizing the transformer 38, it is a very simple expedient to connect the transformer to the contact 17 of potentiometer 16 in such a manner that the output of the transformer 38 and the tapped off voltage from servo-potentiometer will be of opposite phase. As the servo-potentiometer 16, the second transformer 38 and the servo-amplifier 15 are connected in series with each other, any resultant voltage will be amplified on servo-amplifier 15 and fed to the servo-motor to drive the recording head.

In the operation of the apparatus, a surveyor determines the elevation of the seismic source and the elevation of the seismic detectors. These values are fed into potentiometers 28 and 29, respectively. Then, potentiometer 31 is adjusted to reflect the elevation of the datum plane. The velocity tap 42 is adjusted to reflect the average velocity from the surface to the datum plane. At this point it might be noted that the maximum velocity to be expected is in the range of 20,000 feet/sec. Therefore, the maximum voltage which could be tapped off by contact 42 would preferably be equal to 20,000 feet/sec., and intermediate voltages would be equal to proportional feet/sec. The computer will then solve the value of $t$ and the servo-motor will turn to a position at which the servo-potentiometer tap will also tap off a voltage proportional to the value of $t$. In so doing, the recording head will be set to make a recording which will reflect the time of a seismic wave traveling from datum to the subsurface interface and return.

It will be appreciated that the above system could be varied to also introduce other factors or constants such as weathering of the surface layers of the earth. It is apparent that with sum and difference circuitry of the type employed in this invention, may different types of equipment might be utilized to carry out the functions of each piece of equipment in the circuit, and it is contemplated that such other equivalent devices might be substituted for those shown in the drawing and described hereinabove.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. Apparatus comprising, a recording drum having a movable recording head, a servo-motor system drive connected to the recording head, a current source, a circuit connected to the current source and having a plurality of parallel branches, first and second means for respectively tapping off select voltages from two of said parallel branches proportional, respectively, to the elevation of a seismic wave source and the elevation of a seismic detector means, connecting means between said first and second means providing an average of said selected voltages from the two parallel branches, third means for tapping off a selected voltage from a third of said parallel branches proportional to the elevation of a datum plane, means reducing the voltage at said connecting means and the voltage tapped off by said third means by an amount proportional to the velocity of a seismic wave, means connected to said connecting means and to said third means and generating a first output voltage equal to twice the difference between the voltage at said connecting means and the voltage tapped off by said third means, means for tapping off a second voltage from said current source, and fourth means for tapping off a selected voltage from said means for tapping off a second voltage, said fourth means ganged to said recording head, said servo-motor system responsive to any difference between said voltage tapped off by the fourth means and said first output voltage and moving said recording head and fourth means until said voltages are the same.

2. Apparatus comprising, a recording drum having a movable recording head, a servo-motor system drive connected to the recording head, a current source, a circuit connected to the current source and having a plurality of parallel branches, first and second means for respectively tapping off select voltages from two of said parallel branches proportional, respectively, to the elevation of a seismic wave source and the elevation of a seismic detector means, connecting means between said first and second means providing an average of said selected voltages from the two parallel branches, third means for tapping off a selected voltage from a third of said parallel branches proportional to the elevation of a datum plane, means reducing the voltage at said connecting means and the voltage tapped off by said third means by an amount proportional to the velocity of a seismic wave, means connected to said connecting means and to said third means and generating a first output voltage equal to twice the difference between the voltage at said connecting means and the voltage tapped off by said third means, means for tapping off a second voltage from said current source, fourth means for tapping off a selected voltage from said means for tapping off a second voltage, said fourth means ganged to said recording head, and means for comparing said first output voltage and the voltage tapped off by said fourth means and sending a second output voltage proportional to any difference therebetween to said servo-motor system to drive same.

3. Apparatus comprising, a recording drum having a movable recording head, a servo-motor drive connected to the recording head, a first transformer, a circuit having a plurality of parallel branches and means for tapping off a selected voltage from said transformer proportional to the velocity of a seismic wave, first and second means for respectively tapping off selected voltages from two of said parallel branches proportional respectively to the elevation of a seismic wave source and the elevation of seismic detector means, connecting means between said first and second means providing an average of said selected voltages from the two parallel branches, third means for tapping off a selected voltage from a third of said parallel branches proportional to the elevation of a datum plane, means connected to said connecting means and to said third means and generating a first output voltage equal to twice the difference between the voltage at said connecting means and the voltage tapped off by said third means, means for tapping off a second voltage from said transformer, fourth means for tapping off a selected voltage from said means for tapping off a second voltage, said fourth means ganged to said recording head, said first output voltage being of opposite phase to the voltage tapped off by said fourth means, and means for comparing said first output voltage and the voltage tapped off by said fourth means and sending a second output voltage proportional to any difference therebetween to said servo-motor to drive same.

4. Apparatus comprising, a recording drum having a movable recording head, a servo-motor drive connected to the recording head, a first transformer, a circuit having a plurality of parallel branches and means for tapping off a selected voltage from said transformer proportional to the velocity of a seismic wave, first and second means for respectively tapping off selected voltages from two of said parallel branches proportional respectively to the elevation of a seismic wave source and the elevation of seismic detector means, connecting means between said first and second means providing an average of said selected voltages from the two parallel branches, third means for tapping off a selected voltage from a third of said parallel branches proportional to the elevation of a datum plane, a second transformer having its primary winding connected to said connecting means and to said third means and generating in its secondary winding a first output voltage twice the difference between the voltage at said connecting means and the voltage tapped off by said third means, means for tapping off a second voltage from said first transformer, fourth means for tapping off a selected voltage from said means for tapping off a second voltage, said fourth means ganged to said recording head, said first output voltage being of opposite phase to the voltage tapped off by said fourth means, and a servo-amplifier connected in series with said fourth means and the secondary winding of said second transformer and sending a second output voltage to said servo-motor proportional to any difference in the voltage generated by said second transformer and the voltage tapped off by said fourth means to drive same.

5. Apparatus comprising, a recording drum having a movable recording head, a servo-motor drive connected to the recording head, a first transformer, a circuit having a plurality of parallel branches and a sliding tap on the secondary winding of the first transformer for tapping off a selected voltage proportional to the velocity of a seismic wave, first and second potentiometers respectively tapping off selected voltages from two of said parallel branches proportional respectively to the elevation of a seismic wave source and the elevation of a seismic detector means, connecting means between the contact points of the potentiometers providing an average of said selected voltages from the two parallel branches, a third potentiometer for tapping off a selected voltage from a third of said parallel branches proportional to the elevation of a datum plane, a second transformer having its primary winding connected to said connecting means and the contact point of said third potentiometer and generating in its secondary winding a first output voltage twice the difference between the voltage at said connecting means and the voltage tapped off by said third potentiometer, means for tapping off a second voltage from said first transformer, a fourth potentiometer for tapping off a selected voltage from said means for tapping off a second voltage, the contact point of said fourth potentiometer ganged to said recording head, said first output voltage being of opposite phase to the voltage tapped off by the fourth potentiometer, a servo-amplifier connected in series to the contact point of the fourth potentiometer and the secondary winding of said second transformer and sending to said servo-motor a second output voltage proportional to any difference in voltage generated by said second transformer and tapped off by said fourth potentiometer to drive same.

6. Apparatus comprising, a recording drum having a movable recording head, a servo-motor drive connected to the recording head, a servo-amplifier connected to the servo-motor, a first transformer having movable tap, a potentiometer connected across the secondary of said first transformer and having its contact point ganged with said movable recording head, three potentiometers connected in parallel with said movable tap and one of the secondary output lines of said first transformer, connecting means between the contact points of two of said three potentiometers, and means including the primary of a second transformer connecting the contact point of the third of said three potentiometers and said connecting means, said second transformer generating a voltage in its secondary winding twice the potential across its primary and of opposite phase to the voltage from the fixed tap potentiometer, said secondary winding and said servo-amplifier and the contact point of said first mentioned potentiometers connected together in series.

7. Apparatus comprising, a recording drum having a movable recording head, a servo-motor system drive connected to the recording head, a first transformer having a movable tap, a potentiometer connected across the secondary of said first transformer and having its contact point ganged with said movable recording head, three potentiometers connected in parallel with said movable tap and one of the secondary output lines of said first transformer, connecting means between the contact points of two of said three potentiometers, and means including the primary of a second transformer connecting the contact point of the third of said three potentiometers and said connecting means, said second transformer generating a voltage in its secondary winding twice the potential across its primary, said servo-motor system responsive to any difference between said voltage from the fixed tap potentiometer and said first output voltage and moving said recording head and fixed tap potentiometer until said voltages are the same.

References Cited in the file of this patent
UNITED STATES PATENTS
3,023,403     Erath _____ Feb. 27, 1962